United States Patent
Venkata et al.

(10) Patent No.: US 11,611,486 B2
(45) Date of Patent: Mar. 21, 2023

(54) METHOD AND SYSTEM FOR DEPLOYMENT AND MANAGEMENT OF COMPOSITE APPLICATIONS

(71) Applicant: Verizon Patent and Licensing Inc., Basking Ridge, NJ (US)

(72) Inventors: Sivanaga Ravi Kumar Chunduru Venkata, Irving, TX (US); Ajaykumar Kalla, Frisco, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 164 days.

(21) Appl. No.: 17/240,333

(22) Filed: Apr. 26, 2021

(65) Prior Publication Data
US 2022/0345374 A1    Oct. 27, 2022

(51) Int. Cl.
    G06F 15/173    (2006.01)
    H04L 41/14     (2022.01)
    H04L 41/50     (2022.01)
    H04L 67/60     (2022.01)

(52) U.S. Cl.
    CPC .............. *H04L 41/14* (2013.01); *H04L 41/50* (2013.01); *H04L 67/60* (2022.05)

(58) Field of Classification Search
    CPC .......... H04L 41/14; H04L 67/60; H04L 41/50
    See application file for complete search history.

(56) References Cited

U.S. PATENT DOCUMENTS

| | | | |
|---|---|---|---|
| 2020/0028938 A1* | 1/2020 | Rasanen | H04L 45/38 |
| 2020/0389531 A1* | 12/2020 | Lee | H04L 67/52 |
| 2021/0075892 A1* | 3/2021 | Chun | H04L 69/163 |
| 2022/0312289 A1* | 9/2022 | Horita | H04W 36/00837 |

\* cited by examiner

*Primary Examiner* — Thanh T Nguyen

(57) ABSTRACT

A method, a device, and a non-transitory storage medium are described in which a deployment and management of composite application service is provided. The service may allow a third party to develop and on-board logic that manages an application service hosted in an application layer network of a network provider. The logic may include optimization of the application service and remedial procedures that address events associated with degradation and/or performance of the application service. The service may configure resources of a host device to host the logic and expose services provided by the network provider in support of the management of the application service.

20 Claims, 4 Drawing Sheets

METHOD AND SYSTEM FOR DEPLOYMENT AND MANAGEMENT OF COMPOSITE APPLICATIONS

BACKGROUND

Development and design of networks present certain challenges from a network-side perspective and an end device perspective. To enhance performance, among other things, a multi-access edge computing (MEC) network (also known as a mobile edge computing (MEC) network) and other application layer network architectures are being explored for provisioning applications, services, and assets to end devices and users.

DETAILED DESCRIPTION

Figure 1:
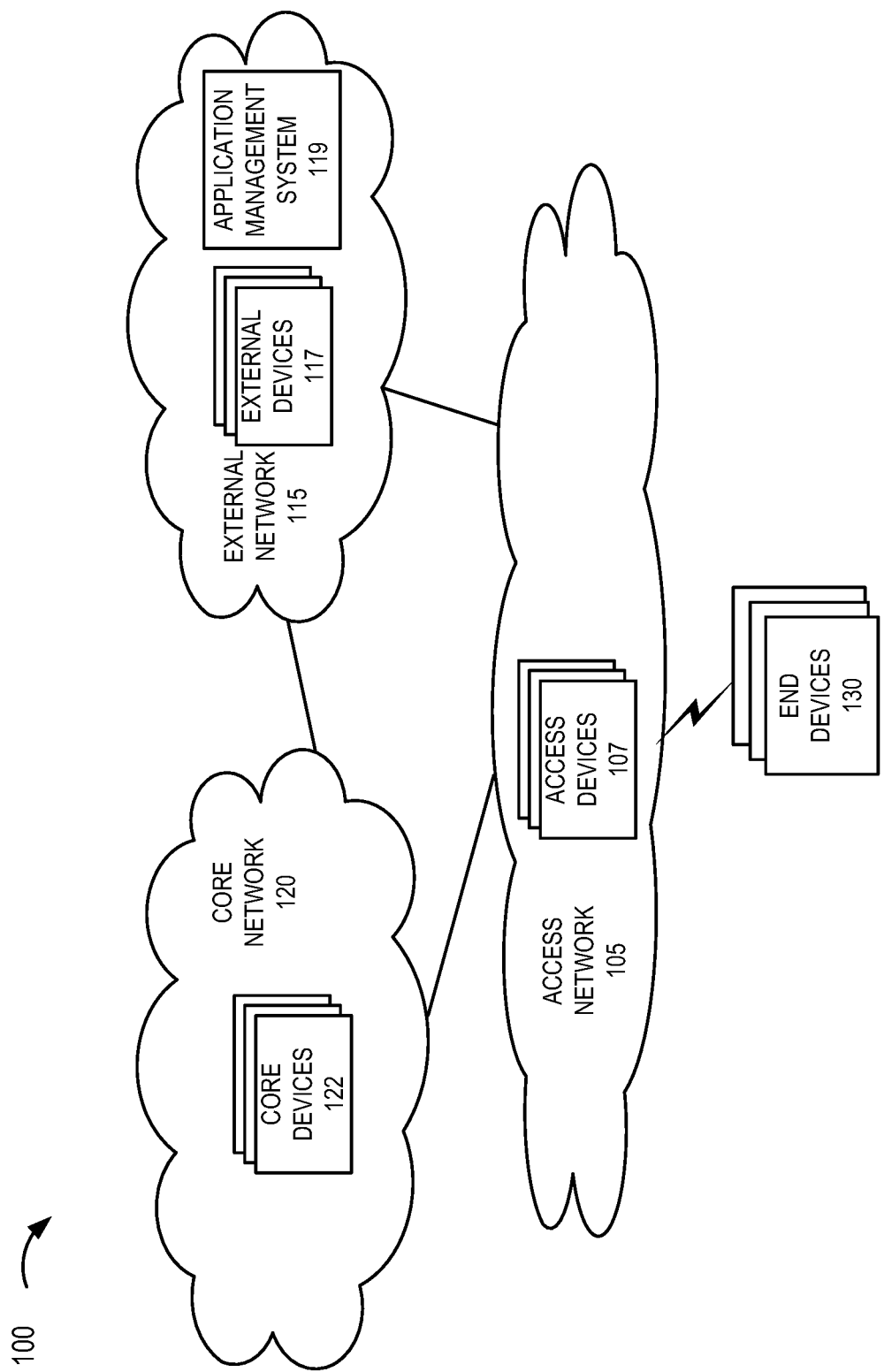
FIG. 1 is a diagram illustrating an exemplary environment in which an exemplary embodiment of a deployment and management of composite application service may be implemented.

The following detailed description refers to the accompanying drawings. The same reference numbers in different drawings may identify the same or similar elements. Also, the following detailed description does not limit the invention.

MEC networks or other types of end device application or service layer networks (referred to as an "application layer network") provide an application, a service, and/or an asset (referred to as an "application service") to end devices and/or users. The application service may include a monolithic application, a microservice, a composite application, a distributed application, or another type of configurable architecture of the application service.

Deployment and management of an application service can be complex. For example, a MEC network or another type of application layer network may host a microservice of a composite application, in which one or multiple other microservices of the composite application may be distributed over one or multiple other locations and networks. Alternatively, for example, the MEC network may host each of the microservices that makeup the composite application but the microservices may be hosted by different application servers associated with different entities (e.g., application service providers or another type of entity) or perhaps different application servers. In this regard, the deployment and management of composite applications and/or distributed applications may require a substantial array of network settings configured to manage installation, optimization, and operational facets. A network provider or another entity (e.g., a solutions provider, etc.) may expend manual and time-consuming resources to onboard and configure the hosting of the composite application (or portion thereof (e.g., a microservice)), build and identify strategies to address prospective run time events, and invoke and learn remedial measures on behalf of application developers, application providers, or similar types of entities and their associated application service, for example.

According to exemplary embodiments, a deployment and management of composite application service is described. The deployment and management of composite application service may enable the design and creation of a deployment model for composite, distributed, and other types of application services. For example, the deployment and management of composite application service may enable a user (e.g., an application developer, an application service provider, or similar third party relative to end users and a network provider, for example) to design and create logic that manages the installation, operational, and optimization aspects associated with the application service. The deployment and management of composite application service may include onboard logic that ingests and manages the installation of the third party logic in a network device of an application layer network. For example, the onboard logic may manage the installation into a virtual entity (e.g., a container, a virtual machine (VM), or another virtualized entity) that isolates and protects network devices and systems of the network provider yet may expose services provided by the network operator that may be used to support managerial facets of an application service, such as a composite application service or a microservice of a composite application service.

According to an exemplary embodiment, the deployment and management of composite application service may expose services of a network operator or similar entity of an application layer network through a network device, such as a gateway device or another suitable device. The network device may manage the exposure of the services in a secure manner and monitor and enforce their usage, as described herein. For example, the services may include a discovery service for the application service, a virtual network service, an alert and notification services, a state information service, and/or other services, as described herein. The network device may be configured and managed by another network device, such as an engine, an orchestrator, and/or another suitable device that includes network operator logic, as described herein.

In view of the foregoing, the deployment and management of composite application service may enable the creation, installation, registration, and running of third party logic that supports a composite application or a component application of the composite application in an application layer network. The deployment and management of composite application service may automate human operations and expose network functions and services of a network operator, for example, in a secure manner. The deployment and management of composite application service may enable application service providers and developers, for example, an agnostic mechanism to onboard and manage application services including optimizations and event-drive decision-making in a variety of configurations while affording security and use of the network operator's network functions and services.

FIG. 1 is a diagram illustrating an exemplary environment 100 in which an exemplary embodiment of deployment and management of composite application service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117) and an application management system 119. Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

The number, the type, and the arrangement of network devices, and the number of end devices 130 are exemplary. A network device may be implemented according to one or multiple architectures, such as a client device, a server device, a peer device, a proxy device, a cloud device, and/or a virtualized network device. Additionally, the network device may be implemented according to various computing architectures, such as centralized, distributed, cloud (e.g., elastic, public, private, etc.), edge network, fog network, and/or another type of computing architecture, and may be incorporated into various types of network architectures (e.g., software defined network (SDN), virtual network, logical network, network slice, etc.).

Environment 100 includes communication links between the networks, between the network devices, and between end devices 130 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication.

Access network 105 may include one or multiple networks of one or multiple types and technologies. For example, access network 105 may be implemented to include a fifth generation (5G) access network (5G AN) or a 5G RAN, a future generation RAN (e.g., a sixth generation (6G) RAN, a seventh generation (7G) RAN, or a subsequent generation RAN). Access network 105 may include a legacy RAN (e.g., a third generation (3G) RAN, a 4G or 4.5 RAN, etc.). Access network 105 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105, external network 115, and/or core network 120.

Access network 105 may include different and multiple functional splitting, such as options 1, 2, 3, 4, 5, 6, 7, or 8 that relate to combinations of access network 105 and core network 120 including an EPC network and/or an NG network (NGC) network, or the splitting of the various layers (e.g., physical layer, medium access control (MAC) layer, radio link control (RLC) layer, and packet data convergence protocol (PDCP) layer, etc.), plane splitting (e.g., user plane, control plane, etc.), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, NSA, SA, etc.), carrier aggregation (CA) (e.g., intra-band, inter-band, contiguous, non-contiguous, etc.), edge and core network slicing, coordinated multipoint (CoMP), and/or another type of connectivity service (e.g., non-standalone (NSA) new radio (NR), stand-alone (SA) NR, etc.).

According to some exemplary embodiments, access network 105 may be implemented to include various architectures of wireless service, such as, for example, macrocell, microcell, femtocell, picocell, metrocell, NR cell, Long Term Evolution (LTE) cell, non-cell, or another type of cell architecture. Additionally, according to various exemplary embodiments, access network 105 may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 gigahertz (GHz), above 6 GHz, higher than mm wave, licensed radio spectrum, unlicensed radio spectrum, above mm wave), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a gNB, an evolved LTE (eLTE) evolved Node B (eNB), an eNB, a radio network controller (RNC), a remote radio head (RRH), a baseband unit (BBU), an RU, a CU, a CU control plane (CU CP), a CU user plane (CU UP), a DU, a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical that provides network access. According to some exemplary implementations, access device 107 may include a combined functionality of multiple RATs (e.g., 4G and 5G functionality, 5G and 5.5G functionality, etc.) via soft and hard bonding based on demands and needs.

External network 115 may include one or multiple networks of one or multiple types and technologies. For example, external network 115 may be implemented to include a service or an application layer network, a cloud network, a private network, a public network, a data center, a MEC network, a fog network, the Internet, a packet data network (PDN), a service provider network, the World Wide Web (WWW), an Internet Protocol Multimedia Subsystem (IMS) network, a Rich Communication Service (RCS) network, an SDN, a virtual network, a packet-switched network, or other type of network that may provide access to and may host an end device application, service, asset, microservice, composite application, a component application of a composite application, a non-composite application, and/or a distributed application (application service).

Depending on the implementation, external network 115 may include various network devices such as external devices 117. For example, external devices 117 may include servers (e.g., web, application, cloud, etc.), mass storage devices, data center devices, network function virtualization (NFV) devices, containers, VMs, SDN devices, cloud computing devices, platforms, and other types of network devices, platforms, and/or architectures pertaining to various network-related functions (e.g., security, management, charging, billing, authentication, authorization, policy enforcement, development, etc.). External network 115 may include one or multiple types of core devices 122, as described herein.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), higher user mobility (e.g., high speed train, remote computing, moving hot spots, etc.), IoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), voice, conferencing, instant messaging), video streaming, and/or other types of wireless and/or wired application services.

According to an exemplary embodiment, external devices 117 may include one or multiple network devices that provide deployment and management of composite application service. For example, as illustrated, application management system 119 may provide deployment and management of composite application service, as described herein. Application management system 119 is described further herein.

Core network 120 may include one or multiple networks of one or multiple network types and technologies. Core network 120 may include a complementary network of access network 105. For example, core network 120 may be implemented to include an NGC network, an EPC of an LTE network, an LTE-Advanced (LTE-A) network, and/or an LTE-A Pro network, a future generation core network (e.g., a 5G, a 6G, a 7G, or beyond core network, etc.), and/or another type of core network.

Depending on the implementation of core network 120, core network 120 may include various types of network devices that are illustrated in FIG. 1 as core devices 122. For example, core devices 122 may include a user plane function (UPF), a Non-3GPP Interworking Function (N3IWF), an access and management mobility function (AMF), a session management function (SMF), a unified data management (UDM) device, a unified data repository (UDR) device, an authentication server function (AUSF), an NSSF, a network repository function (NRF), a policy control function (PCF), a binding support function (BSF), a network data analytics function (NWDAF), a network exposure function (NEF), a lifecycle management (LCM) device, an application function (AF), a mobility management entity (MME), a packet gateway (PGW), an enhanced packet data gateway (ePDG), a home subscriber server (HSS), an authentication, authorization, and accounting (AAA) server, a policy and charging rules function (PCRF), a policy and charging enforcement function (PCEF), and/or a charging system (CS). According to other exemplary implementations, core devices 122 may include additional, different, and/or fewer network devices than those described. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), and/or other combined nodes.

End devices 130 include a device that may have computational and/or communication capabilities (e.g., wireless, wired, optical, etc.). End device 130 may be implemented as a mobile device, a portable device, a stationary device (e.g., a non-mobile device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device (e.g., other type of user equipment (UE)). End device 130 may be configured to execute various types of software (e.g., applications, programs, etc.). The number and the types of software may vary among end devices 130.

End device 130 may support one or multiple RATs (e.g., 4G, 5G, and/or future generation RAT) and various portions of the radio spectrum (e.g., multiple frequency bands, multiple carrier frequencies, licensed, unlicensed, mm wave, above mm wave, etc.), various levels and genres of network slicing, DC service, and/or other types of connectivity services. Additionally, end device 130 may include one or multiple communication interfaces that provide one or multiple (e.g., simultaneous, interleaved, etc.) connections via the same or different RATs, frequency bands, carriers, network slices, and/or other communication medium (e.g., wired, etc.). The multimode capabilities of end device 130 may vary among end devices 130.

Figure 2:
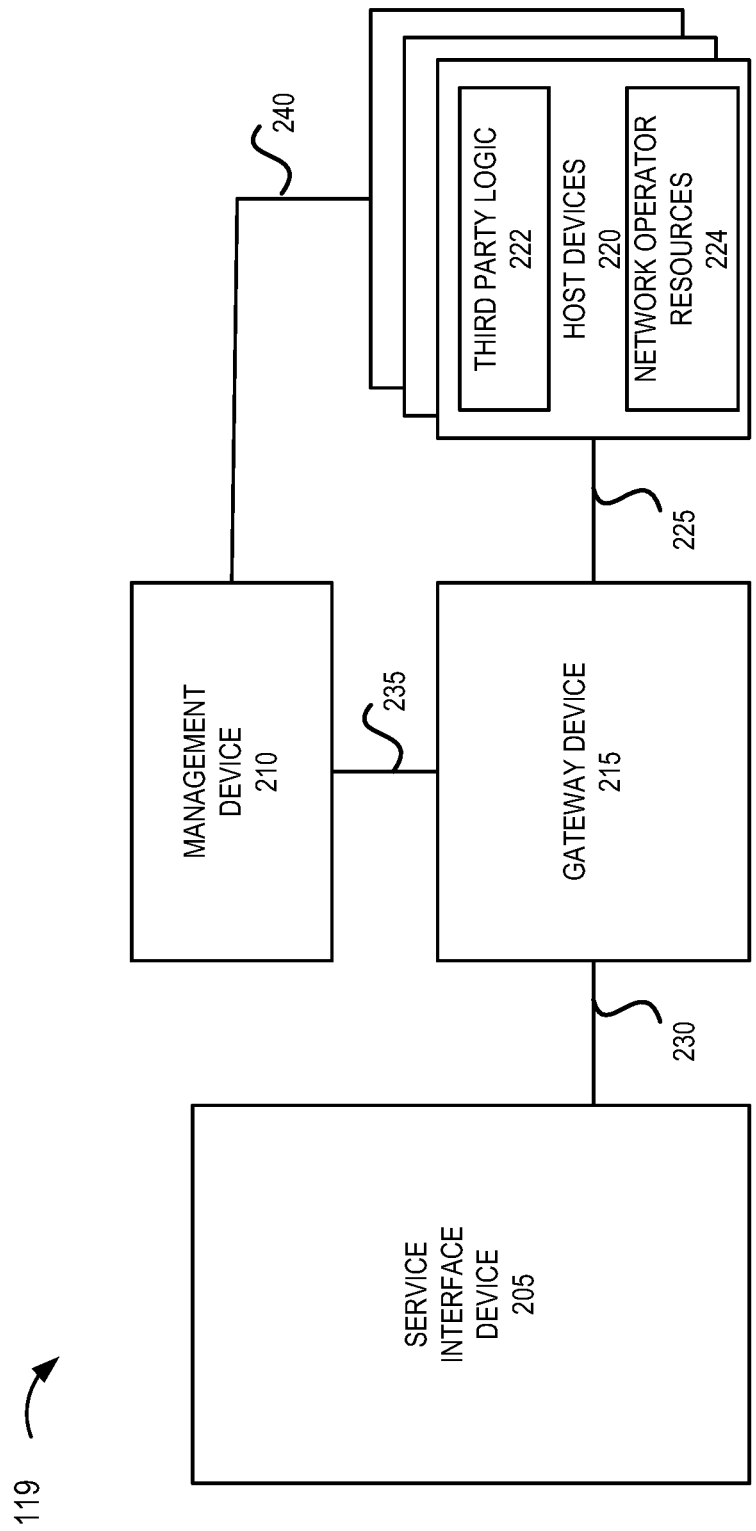
FIG. 2 is a diagram illustrating exemplary components in which an exemplary embodiment of deployment and management of composite application service may be implemented.

FIG. 2 is a diagram illustrating exemplary components in which an exemplary embodiment of deployment and management of composite application service may be implemented. As illustrated, application management system 119 may include a service interface device 205, a management device 210, a gateway device 215, and host devices 220. Application management system 119 may be communicatively coupled via exemplary links 225, 230, 235, and 240. For example, a link may be implemented to include a hardware link (e.g., a bus, a shared memory space, etc.), a software link (e.g., inter-process communication (IPC), etc.) or some other type of communicative link (e.g., an application programming interface (API), a wired connection, an optical connection, a wireless connection, etc.).

The number, type, and arrangement of network devices and links are exemplary. According to other exemplary embodiments, application management system 119 may include additional, fewer, and/or different network devices to provide deployment and management of composite application service or a sub-service, a function, and/or a step of a process in support of deployment and management of a composite application service, as described herein.

Service interface device 205 may include one or multiple network devices that provide various services that assist in the deployment and management of an application service hosted in an application layer network. For example, service interface device 205 may expose these support services to host devices 220, which may host third party application services (e.g., a microservice of a composite application, a composite application, a distributed application, or another type of application service) and include third party logic (e.g., third party network functions, third party workflows, third party strategies, third party intents, and the like). The service interface device 205 may expose these support services to host devices 220 via gateway device 215, as described herein. According to an exemplary embodiment, the services may be provided by a network operator or similar entity of the application layer network.

According to various exemplary embodiments, the services may include an artificial intelligence (AI) service, a discovery service, a virtual network service, an alert and notification service, a state information service, and/or other services that may assist third parties and associated application services and management logic.

The AI service may include one or multiple types of device intelligence, such as reinforcement-based learning, unsupervised learning, semi-supervised learning, supervised learning, deep learning, machine learning (ML), and/or other types of learning-based and/or intelligence logic. The AI service may support migration of application service between different locations and/or application layer networks, for example, and/or another support service. The discovery service may provide selection of optimal locations, application layer networks, and/or host devices to support end device requests for application services and application service session management.

The virtual network service may provide management of network functions and/or network devices. The network functions and/or network device may include virtual and/or non-virtual functions and/or devices. For example, the network functions and/or network devices may include security devices (e.g., firewalls and/or another network device that provides a security-related service) and other types of network devices (e.g., routers and/or other types of intermediary network devices). The virtual network service may provide a software-defined (SD) wide area network (SD-WAN) and/or virtual WAN (vWAN) service, setup and enforce network rules and policies, and publish available network functions and/or network devices to host devices 220, for example.

The alert and notification service may provide notifications and/or alerts to application service providers or similar entities regarding application service events and/or requests or tickets regarding application service issues, and measures taken that are responsive to the requests or tickets.

The state information service may obtain state information pertaining to access network 105, external network 115, core network 122, and/or other networks, as described herein. The state information service may obtain state information from various access devices 107, core devices 122, external devices 117, other network devices (e.g., backhaul, fronthaul, etc.), and/or network performance monitoring devices, for example. The state information may include load or utilization values and/or available resource values pertaining to various types of resources (e.g., physical, virtual, logical, hardware, software, communication interfaces, etc.) associated with network devices and communication links (e.g., wireless, wired, optical, etc.), radio resources, information pertaining to data radio bearers, uplink, and downlink channels, and so forth. The state information may include other types of data, such data indicating a key performance indicator (KPI), a performance metric value (e.g., delay, throughput, error rate, round trip time, bit rate, and/or another type of metric), a level of congestion data (e.g., low, medium, high, or other value), and/or data indicating a current and/or predictive network condition. The state information may also include the number of application service requests received over a period of time and application service performance metrics (e.g., average response time, queue time, application availability, and/or other types of performance values or scores), for example.

Management device 210 may include logic that configures and manages gateway device 215. For example, management device 210 may configure rules and policies that may govern access to and use of services of service interface device 205 may host devices 220. Management device 210 may also restrict communication by host devices 220 to only gateway device 215. For example, third party logic of a host device 220 may not be able to communicate with other network devices and/or systems external from the application layer network.

Management device 210 may include logic that enables third parties (e.g., application service providers, application developers, and/or similar types of entities) to onboard application services (e.g., a microservice, a composite application service, a distributed application service, and/or another type of application service) onto host devices 220. Management device 210 may also include logic that enables the third parties to onboard application service management logic (e.g., network functions, workflows, strategies, etc.) that may manage installation, operation, optimization, and notification and alarm configurations in support of the application services, such as a composite application, a distributed application, and/or a microservice, as described herein. For example, management device 210 may provide an interactive portal service that ingests and onboards application services and application service management logic.

Management device 210 may include logic that supports the application service management logic. For example, management device 210 may include flow engines that may run workflows of third parties, create proxies pertaining to communications between third party virtual entities of host devices 220 and gateway device 215, provide service mesh services (e.g., allowing services to discover and provide reliable communications with each other, traffic routing, load balancing, service failure recovery, security, observability, etc.), provide intent management services, strategic management services, security management services, directed flow management services, and graph database services.

Management device 210 may bundle the third party logic and route the control logic into a virtual entity (e.g., a container, a VM, or another type of virtual entity) and allow the control logic to run in a dedicated tenant space, project, or another type of virtualization construct. The application service management logic may operate in an isolated environment on a host device 220. In this way, network operator resources of host device 220 (e.g., virtual entities, web services, physical resources, etc.) may operate and support the third party logic in a secure manner and allow the third party to manage various facets of the application service.

Gateway device 215 may include a network device that provides API services between host devices 220 and service interface device 205. For example, gateway device 215 may include an API proxy that receives API calls or requests from third party logic 222 of host devices 220 for network operator services. The API proxy may monitor and enforce API calls or requests according to configurations provided by management device 210. For example, the API calls or request may have to comply with requisite headers, payloads, and other context to enable access to the services provided via service interface device 205. Gateway device 215 may include logic that collects and stores historical information pertaining to API calls or requests for debugging and solution purposes. Gateway device 215 may provide other services, such as security services (e.g., authentication and authorization, etc.) and service mesh services, for example.

Host devices 220 may include network devices that that host application services. Host device 220 may be implemented to include physical resources and logical and/or virtual resources. The physical resources may include hardware resources, such as a processor, a memory, a storage, a communication interface, and/or other types of hardware, for example. The hardware resources may be shared, dedicated, virtualized, logical, and/or another type of configuration. The physical resources may also include software (e.g., a micro-application, a composite application, a program, or another type of application) and other elements, such as binaries, libraries, an operating system, or another type of element, layer, or function that supports the operation of a virtual entity.

Host device 220 may include one or multiple virtual entities, such as a container-based, hypervisor-based (e.g., bare-metal hypervisor, hosted hypervisor) (also known as a VM), or other known (e.g., proprietary, hybrid, etc.) network function virtualization (NFV), or future generation virtualization. Host device 220 may include a virtual entity that executes the application service, as described herein. Host device 220 may include a virtual entity that executes the application service management logic, such as third party network functions, workflows, strategies, intents, optimizations, and/or other facets of application service management that may relate to the installation, operation, optimization, and remedial aspects of the application service. For example, the management logic may include logic that pertains to installation aspects such as finding optimal locations for the application service, checking resource availability at a location and/or at an application layer network, reserving resources at an application layer network, and installing applications and their dependencies at an application layer network. Additionally, for example, the management logic may include logic that pertains to operational aspects, such as setting up network slices, provisioning network functions, such as firewalls, SD-WANs, routers, and/or other types of supporting network functions, setting rules and/or policies pertaining to the network functions, adding domain name system (DNS) entries for discovery, handling upgrades of an application service (e.g., a composite application, a microservice of the composite application, etc.) and a network, backing up and restoring the application service, and simulating and running tests (e.g., chaos monkey tests), such as part of an on-boarding procedure. The management logic may also include logic that controls various optimization facets, which may pertain to autoscaling, migration, termination, restoration, and other optimization facets of the application service, as well as application component specific methods and notification and alarm procedures. The management logic may also include logic that may coordinate a procedure with other management logic that may reside in another host device and/or application layer network in relation to a composite application and associated microservice applications.

Host device 220 may include other elements in support of the deployment and management of composite application service. For example, host device 220 may include logic that manages communication to and from gateway device 215 and communication to and from management device 110. Host device 220 may include even other elements that may provide network operator services, such as a web service, containers, and other management plane services. According to such an exemplary configuration, host device 220 may include third party logic 222 and network operator resources 224. Third party logic 222 such as management logic and an application service may operate in a secure and isolated space relative to network operator resources and logic. For example, third party logic 222 may be implemented in a Kubernetes project.

According to an exemplary embodiment, external network 115 may be implemented as a MEC network. The MEC network may be implemented using one or multiple technologies including, for example, network function virtualization (NFV), containers, SDN, cloud computing, Infrastructure-as-a-Service (IaaS), Platform-as-a-Service (PaaS), Software-as-a-Service (SaaS), or another type of network technology. Depending on the implementation, network devices of the MEC network (e.g., external device 117) may include an orchestrator (e.g., a network function virtualization orchestrator (NFVO), a mobile edge (ME) orchestrator, etc.), a virtualized infrastructure manager (VIM), a virtual network function manager (VNFM), an ME platform manager, an operations support system (OSS), a local domain name system (DNS), registries, and/or other types of network devices (e.g., routers, core devices 122, an ingress device, a load balancer, etc.), and network resources (e.g., storage devices, communication links, host devices 220, VMs, etc.).

Figure 3:
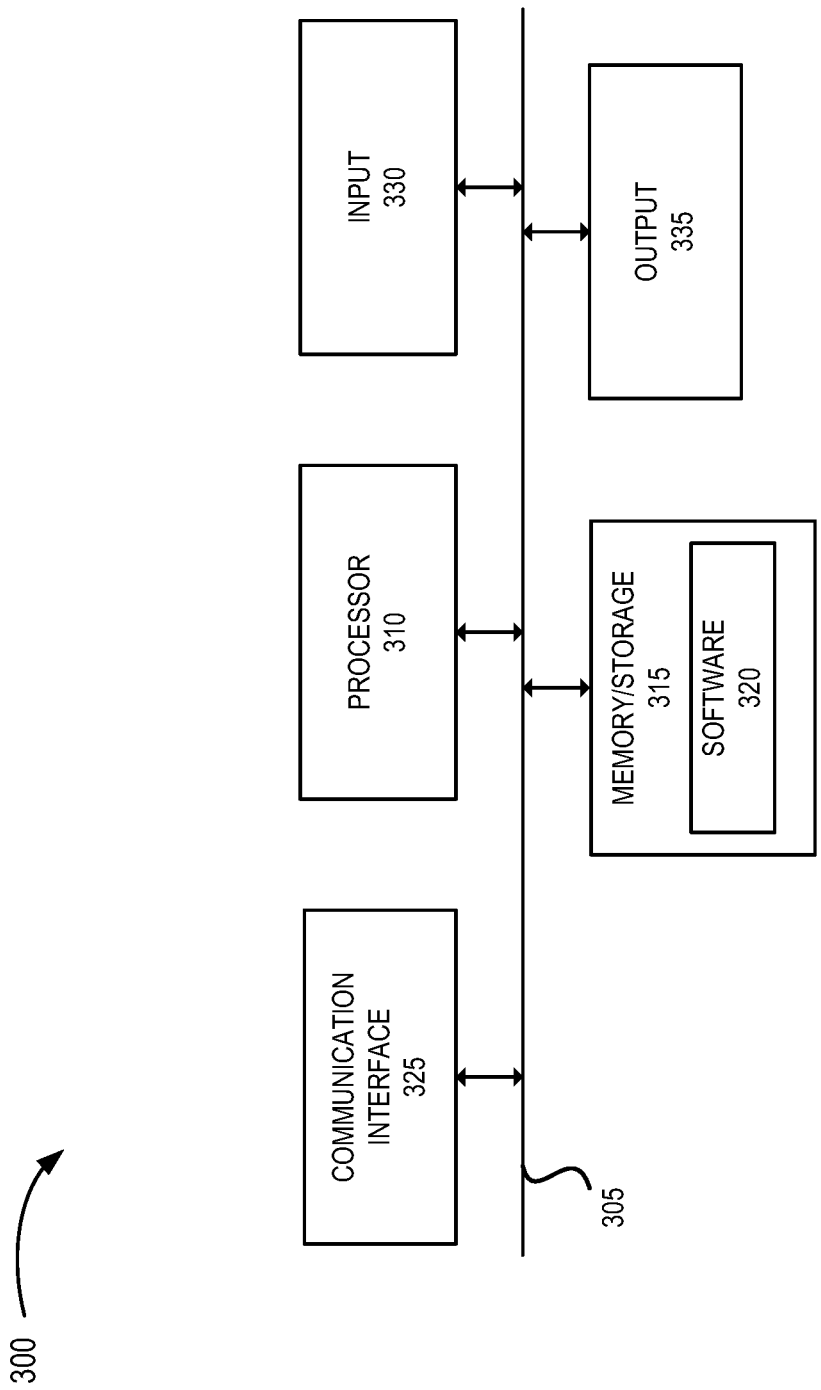
FIG. 3 is a diagram illustrating exemplary components of a device that may correspond to one or more of the devices illustrated and described herein.

FIG. 3 is a diagram illustrating exemplary components of a device 300 that may be included in one or more of the devices described herein. For example, device 300 may correspond to access device 107, external device 117, application management system 119, core device 122, end device 130, and/or other types of network devices, as described herein. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation, or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, learning, model-based, etc.

Memory/storage 315 includes one or multiple memories and/or one or multiple other types of storage mediums. For example, memory/storage 315 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 315 may include a hard disk (e.g., a magnetic disk, an optical disk, a magneto-optic disk, a solid-state disk, etc.), a Micro-Electromechanical System (MEMS)-based storage medium, and/or a nanotechnology-based storage medium. Memory/storage 315 may include drives for reading from and writing to the storage medium.

Memory/storage 315 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. As an example, with reference to application management system 119, software 320 may include an application that, when executed by processor 310, provides a function and/or a process of deployment and management of composite application service, as described herein. Software 320 may also include firmware, middleware, microcode, hardware description language (HDL), and/or other form of instruction. Software 320 may also be virtualized. Software 320 may further include an operating system (OS) (e.g., Windows, Linux, Android, proprietary, etc.).

Communication interface 325 permits device 300 to communicate with other devices, networks, systems, and/or the like. Communication interface 325 includes one or multiple wireless interfaces and/or wired interfaces. For example, communication interface 325 may include one or multiple transmitters and receivers, or transceivers. Communication interface 325 may operate according to a protocol stack and a communication standard. Communication interface 325 may include an antenna. Communication interface 325 may include various processing logic or circuitry (e.g., multi-plexing/de-multiplexing, filtering, amplifying, converting, error correction, application programming interface (API), etc.). Communication interface 325 may be implemented as a point-to-point interface, a service-based interface, or a reference interface, for example.

Input 330 permits an input into device 300. For example, input 330 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 300 may be implemented in the same manner. For example, device 300 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in an application layer network (e.g., external network 115) and/or another type of network (e.g., access network 105, core network 120, etc.). Thus, network devices described herein may be implemented as device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a function or a process described herein. Alternatively, for example, according to other implementations, device 300 performs a function or a process described herein based on the execution of hardware (processor 310, etc.).

Figure 4:
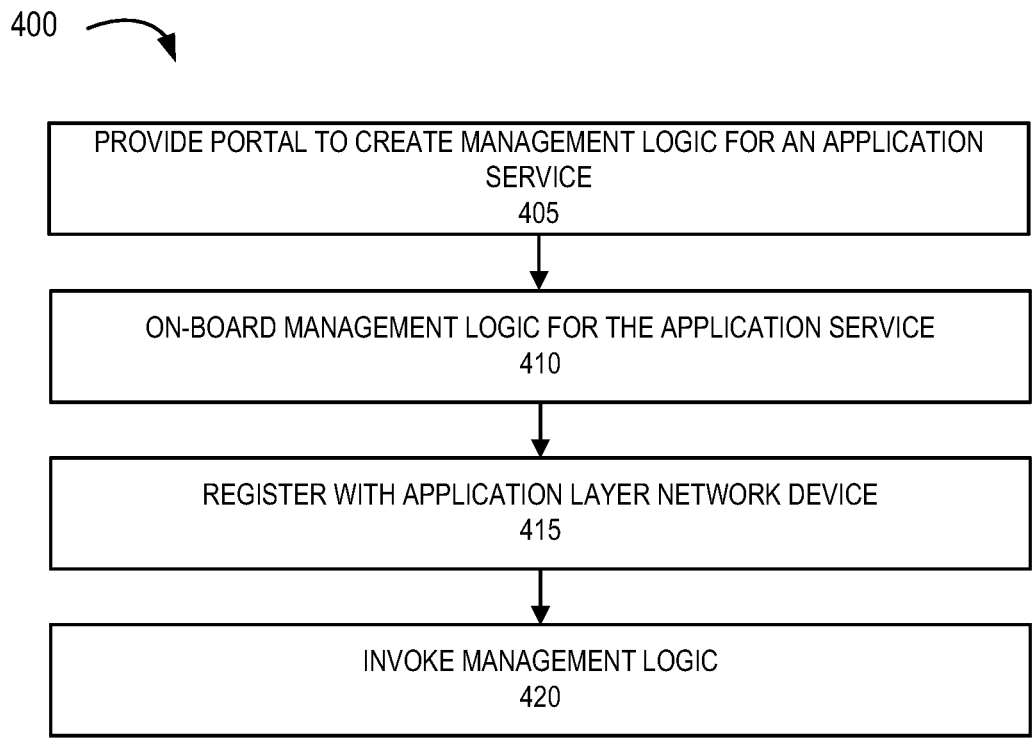
FIG. 4 is a flow diagram illustrating an exemplary process of an exemplary embodiment of deployment and management of composite application service.

FIG. 4 is a flow diagram illustrating another exemplary process 400 of an exemplary embodiment of deployment and management of composite application service. According to an exemplary embodiment, application management system 119 may perform a step of process 400. For example, a component of application management system 119, such as service interface device 205, management device 210, gateway device 215, or host device 220 or a combination of components (e.g., two or more components) may perform a step of process 400. According to an exemplary implementation, processor 310 executes software 320 to perform the step of process 400, as described herein. Alternatively, the step may be performed by execution of only hardware.

According to an exemplary embodiment, the users of application management system 119, as described in relation to process 400, may be of one or multiple application service providers that may each be providing an application service via an application layer network. For example, an application service provider (entity A) of an application service may use an application layer network (e.g., a MEC network or another type of network as described herein) of an application layer network provider (entity B). In this way, the application layer network provider may allow various application service providers (e.g., potentially a multi-tenant environment) to provision and manage their application services using the deployment and management of composite application service of application management system 119. In some cases, the application layer network provider may also provide access and use of other networks (e.g., access network 105, core network 120, and other types of networks, as described herein) that supports access to the application services by end devices 130 and/or users of end devices 130.

In block 405, application management system 119 may provide developmental tools for application service management. For example, application management system 119 may include a portal or another type of user interface that provides an interactive and developmental environment for users. A user may access the portal or other type of user interface and may upload applications into an application library, for example. The user may be able to create a solution using applications, setting network intents, selecting a network blueprint, and selecting SLA KPIs for an application service. The portal or other type of user interface may provide a list of predefined strategies or workflows, pre-defined application service events, pre-defined AI decisions, and/or pre-defined SLA KPIs to which the user may select from for the application service. Additionally, or alternatively, the portal or other type of user interface may allow the user to create his or her own proprietary or customized mapping between a workflow with a given event/SLA KPI/decision using a directed flow logic. The user may save the configured solution into a solution library, for example. The portal or other type of user interface may generate artifacts and provide them to an application layer network management device. For example, the application layer network management device may be implemented as a MEC orchestrator or similar type of device associated with another type of application layer network.

In block 410, application management system 119 may onboard management logic for the application service. For example, the user may upload the workflow and/or a network function code. Application management system 119 may validate the code and check for any compatibility issues (e.g., using a data language, such as Yet Another Markup Language (YAML) or another suitable language). If successfully validated and determined to be compatible, application management system 119 may wrap the third party management logic into a container or another type of virtual entity, for example. The virtual entity may also include a web server. Application management system 119 may load the workflow and/or network function code into a folder or other file system entity. Applicant management system 119 may perform testing and validation procedures.

In block 415, application management system 119 may register the virtual entity with an application layer network device. For example, a MEC orchestrator may start the virtual entity (e.g., container that executes the third party management logic) and may register the virtual entity with access and use of gateway device 215 and service interface device 205. The MEC orchestrator may create a domain for the third party logic. The virtual entity may start a webservice and the MEC orchestrator may fetch the workflows (e.g., third party management logic) from the webservice. The MEC orchestrator may register the workflows and virtual entity with the domain. The MEC orchestrator may set up or register security mechanisms (e.g., authentication, authorization, etc.) and permissions to enable the virtual entity to access and use one or multiple services of service interface device 205 via gateway device 215 and associated network operator APIs. The MEC orchestrator may register workflow identifiers, which identify the workflows, with application service identifiers, which identify the application services. Additionally, or alternatively, the MEC orchestrator may register the workflow identifiers to directed flow identifiers of a graph database.

In block 420, application management system 119 may invoke a management function and/or workflow based on an occurrence of an actionable event that may need to be addressed. For example, the actionable event may relate to a degradation of the performance of the application service, an optimization issue, or some other type of operational problem. The MEC orchestrator may derive information (e.g., application identifier, a customer identifier, and/or another type of context information) associated with the actionable event. The MEC orchestrator may perform a lookup (e.g., in a database) and map or correlate a workflow identifier to the actionable event and associated application service. Based on the selection, the workflow may be invoked and executed. During the execution of the workflow, the management logic may generate an API call and transmit the API call to service interface device 205 via gateway device 215. The management logic may perform one or multiple strategies to remedy an identified event depending on the success or failure of a strategy or workflow. Management logic may perform rollbacks, and/or other types of compensation measures, and if further failures occur, management logic may invoke a ticketing service. For example, the ticketing service may capture context information (e.g., previous steps/actions taken, reasons for and types of failures, and other types of relevant information as described herein). The ticketing service may generate a ticket, which may include the context information, and may transmit the ticket to a network device associated with a network administrator, for example. Alternatively, when the strategy is successful, the third party composite or microservice application may continue to provide the application service to end devices 130.

FIG. 4 illustrates an exemplary embodiment of a process of deployment and management of composite application service, according to other exemplary embodiments, the deployment and management of composite application service may perform additional operations, fewer operations, and/or different operations than those illustrated and described.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described regarding the process illustrated in FIG. 4, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   onboarding, by a network device of an application layer network associated with a first entity, logic of a second entity that manages actionable events pertaining to an application service associated with the second entity to be executed in the application layer network;
   configuring, by the network device, resources of the first entity that enables the logic to access support services of the first entity;
   selecting, by the network device after the application service is executing in the application layer network, a procedure that addresses one of the actionable events that has occurred; and
   invoking, by the network device, the procedure to be executed by the logic.

2. The method of claim 1, wherein the configuring comprises:
   registering, by the network device, security information and permissions for application programming interface (API) calls pertaining to a virtual entity that is to host the application service and access to the support services.

3. The method of claim 1, wherein the configuring comprises:
   registering, by the network device, first identifiers that identify procedures that address the actionable events with a second identifier that identifies the application service.

4. The method of claim 1, wherein the onboarding comprises:
   validating, by the network device, the logic of the second entity; and
   configuring, by the network device based on successfully validating, the logic into a virtual entity of a host device associated with the first entity, which is to host the application service.

5. The method of claim 1, further comprising:
   providing, by the network device before the onboarding, a portal that allows a user associated with the second entity to create the logic.

6. The method of claim 1, wherein the logic that manages the actionable events includes first logic that addresses a degradation of the application service and second logic that optimizes the application service.

7. The method of claim 1, wherein the application service is a microservice application of a composite application that includes at least one other microservice application that is hosted in another application layer network.

8. The method of claim 1, wherein the application layer network is a multi-access edge computing (MEC) network, and the network device includes a MEC orchestrator.

9. A network device comprising:
   a processor configured to:
      onboard, by the network device of an application layer network associated with a first entity, logic of a second entity that manages actionable events pertaining to an application service associated with the second entity to be executed in the application layer network;

configure resources of the first entity that enables the logic to access support services of the first entity;

select after the application service is executing in the application layer network, a procedure that addresses one of the actionable events that has occurred; and invoke the procedure to be executed by the logic.

10. The network device of claim 9, wherein when configuring, the processor is further configured to:

register security information and permissions for application programming interface (API) calls pertaining to a virtual entity that is to host the application service and access to the support services.

11. The network device of claim 10, wherein when configuring, the processor is further configured to:

register first identifiers that identify procedures that address the actionable events with a second identifier that identifies the application service.

12. The network device of claim 9, wherein when onboarding, the processor is further configured to:

validate the logic of the second entity; and configure, based on successful validation, the logic into a virtual entity of a host device associated with the first entity, which is to host the application service.

13. The network device of claim 9, wherein the processor is further configured to:

provide before the onboarding, a portal that allows a user associated with the second entity to create the logic.

14. The network device of claim 9, wherein the logic that manages the actionable events includes first logic that addresses a degradation of the application service and second logic that optimizes the application service.

15. The network device of claim 9, wherein the application service is a microservice application of a composite application that includes at least one other microservice application that is hosted in another application layer network.

16. The network device of claim 9, wherein the application layer network is a multi-access edge computing (MEC) network, and the network device includes a MEC orchestrator.

17. A non-transitory computer-readable storage medium storing instructions executable by a processor of a network device, which when executed cause the processor to:

onboard, by the network device of an application layer network associated with a first entity, logic of a second entity that manages actionable events pertaining to an application service associated with the second entity to be executed in the application layer network;

configure resources of the first entity that enables the logic to access support services of the first entity;

select after the application service is executing in the application layer network, a procedure that addresses one of the actionable events that has occurred; and invoke the procedure to be executed by the logic.

18. The non-transitory computer-readable storage medium of claim 17, wherein the instructions to configure comprise further instructions, which when executed, cause the processor to:

register security information and permissions for application programming interface (API) calls pertaining to a virtual entity that is to host the application service and access to the support services.

19. The non-transitory computer-readable storage medium of claim 17, wherein the instructions to onboard comprise further instructions, which when executed, cause the processor to:

validate the logic of the second entity; and configure based on successful validation, the logic into a virtual entity of a host device associated with the first entity, which is to host the application service.

20. The non-transitory computer-readable storage medium of claim 17, wherein the logic that manages the actionable events includes first logic that addresses a degradation of the application service and second logic that optimizes the application service.

* * * * *